United States Patent
Patzwald

(10) Patent No.: US 9,261,351 B1
(45) Date of Patent: Feb. 16, 2016

(54) CHROMATIC RANGE SENSOR INCLUDING HIGH SENSITIVITY MEASUREMENT MODE

(71) Applicant: Mitutoyo Corporation, Kanagawa-ken (JP)

(72) Inventor: Andrew Michael Patzwald, Kirkland, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 0 days.

(21) Appl. No.: 14/638,922

(22) Filed: Mar. 4, 2015

(51) Int. Cl.
 *G01B 11/28* (2006.01)
 *G01B 11/06* (2006.01)
 *G01B 11/02* (2006.01)
 *G01B 11/00* (2006.01)

(52) U.S. Cl.
 CPC ............. *G01B 11/06* (2013.01); *G01B 11/002* (2013.01); *G01B 11/026* (2013.01)

(58) Field of Classification Search
 CPC ....................................................... G01B 11/28
 USPC ......................................................... 356/630
 See application file for complete search history.

(56) References Cited

U.S. PATENT DOCUMENTS

| 5,785,651 A * | 7/1998 | Kuhn ................... G01B 11/026 250/339.06 |
| 7,324,682 B2 | 1/2008 | Wasserman |
| 7,454,053 B2 | 11/2008 | Bryll et al. |
| 7,876,456 B2 | 1/2011 | Sesko |
| 8,085,295 B2 | 12/2011 | Tobiason et al. |
| 2005/0030528 A1* | 2/2005 | Geffen ................. G01B 11/026 356/237.1 |
| 2005/0031191 A1 | 2/2005 | Venkatachalam |
| 2010/0188742 A1 | 7/2010 | Chen et al. |
| 2011/0013186 A1* | 1/2011 | Miki .................... G01B 11/026 356/364 |

* cited by examiner

*Primary Examiner* — Roy M Punnoose
(74) *Attorney, Agent, or Firm* — Seed IP Law Group PLLC

(57) ABSTRACT

A method is provided for operating a chromatic range sensor (CRS) system, which may comprise a chromatic point sensor (CPS) system including an optical pen, to measure a low reflectivity surface. The CRS system may include a high sensitivity measurement mode in which it uses an unconventional low sampling rate or "long" self-saturating exposure time, to measure the low reflectivity surface. The "long" self-saturating exposure time may cause one or more detector pixels to self-saturate to at least a saturation threshold level, which prevents them from indicating a valid wavelength peak. Such pixels may define an invalid peak portion of a nominal total measurement range. The CRS may still detect a valid wavelength peak or height measurement, when the surface is located in a valid subset of the nominal total measurement range of the CRS system determined such that it excludes the invalid peak portion.

20 Claims, 10 Drawing Sheets

| Distance Indicating Coordinate (DIC) | Measurement Distance (microns) |
|---|---|
| 1 | Out of range |
| ≈ | ≈ |
| 104.1 | 36.9029 |
| 104.2 | 37.0303 |
| 104.3 | 37.1804 |
| 104.4 | 37.3557 |
| 104.5 | 37.4863 |
| ≈ | ≈ |
| 604.1 | 381.6882 |
| 604.2 | 381.7224 |
| 604.3 | 381.7565 |
| ≈ | ≈ |
| 990.1 | 486.6540 |
| 990.2 | 486.6733 |
| ≈ | ≈ |
| 1024 | Out of range |

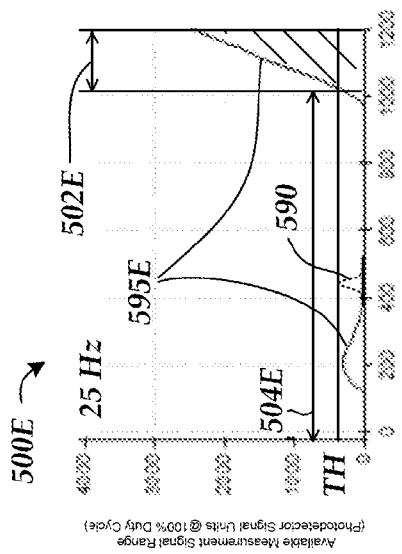
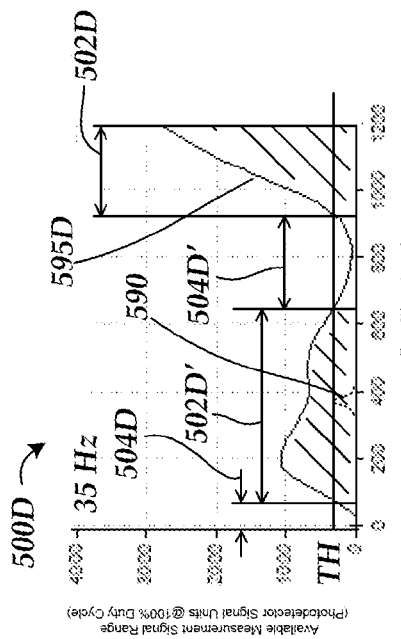
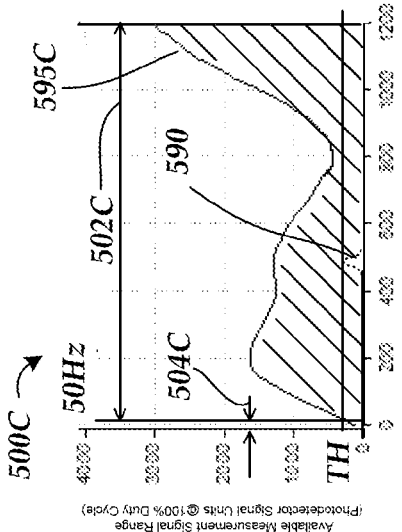
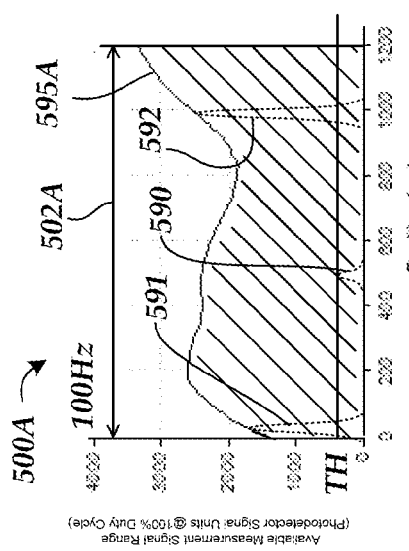
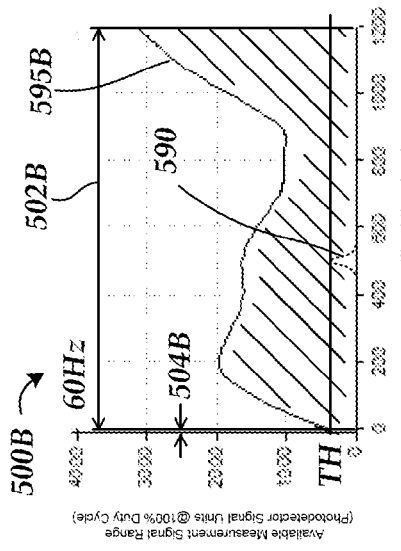

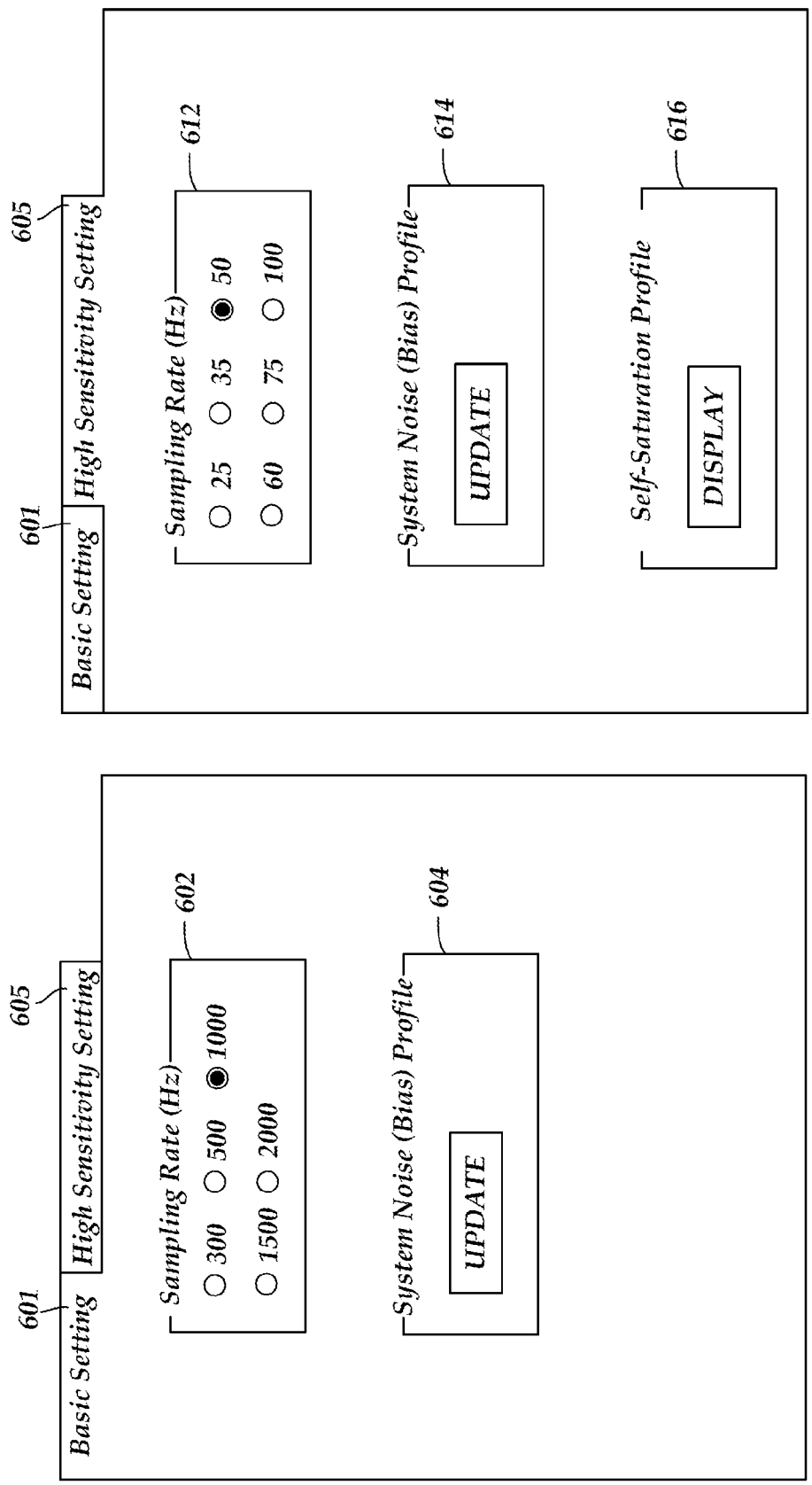

CHROMATIC RANGE SENSOR INCLUDING HIGH SENSITIVITY MEASUREMENT MODE

BACKGROUND

1. Technical Field

The invention relates to precision measurement instruments, and particularly to chromatic range sensors and similar optical distance determining devices, and their use.

2. Description of the Related Art

It is known to use chromatic confocal techniques in optical height or distance or range sensors. As described in U.S. Pat. No. 7,876,456 (the '456 patent), which is hereby incorporated herein by reference in its entirety, an optical element having axial chromatic aberration, also referred to as axial or longitudinal chromatic dispersion, may be used to focus a broadband light source such that the axial distance to the focus varies with the wavelength. Thus, only one wavelength will be precisely focused on a surface, and the surface height or distance relative to the focusing element determines which wavelength is best focused. Upon reflection from the surface, the light is refocused onto a small detector aperture, such as a pinhole or the end of an optical fiber. Upon reflection from the surface and passing back through the optical system to the in/out fiber, only the wavelength that is well-focused on the surface is well-focused on the aperture. All of the other wavelengths are poorly focused on the aperture, and so will not couple much power into the fiber. Therefore, for the light returned through the fiber, the signal level will be greatest for the wavelength corresponding to the surface height or distance to the surface. A spectrometer type detector measures the signal level for each wavelength, in order to determine the surface height.

Certain manufacturers refer to practical and compact chromatic range sensing (CRS) systems that operate as described above, and that are suitable for use in an industrial setting, as chromatic point sensors (CPS) or chromatic line sensors, or the like. A compact chromatically-dispersive optical assembly used with such systems is referred to as an "optical pen," or a "pen." The optical pen is connected through an optical fiber to an electronic portion of the chromatic point sensor which transmits light through the fiber to be output from the optical pen and which provides a spectrometer that detects and analyzes the returned light. The returned light forms a wavelength-dispersed intensity profile received by the spectrometer's detector array. Pixel data corresponding to the wavelength-dispersed intensity profile is analyzed to determine the "dominant wavelength peak pixel coordinate" as indicated by a peak or centroid of the intensity profile, and the dominant wavelength peak pixel coordinate is used with a lookup table to determine the distance to the surface. The dominant wavelength peak pixel coordinate may be determined with sub-pixel resolution, and may be referred to as the "distance-indicating pixel coordinate."

Also known in the art is a CRS, which is a "line sensor" that uses a slit aperture and focuses light along a line rather than a point, providing the capability to measure a distance to a surface at a number of points along that line, as disclosed in U.S. Patent Application Publication No. 2010/0188742, which is hereby incorporated herein by reference in its entirety.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Some workpiece surfaces may have particularly low reflectivity, (e.g., matte black or transparent workpieces) and provide a low signal, which is insufficient to produce a significant (valid) wavelength peak that can be well-estimated in a resulting intensity profile received by the spectrometer's detector array. One way to boost the signal (e.g., the wavelength peak) is to increase the signal integration time, i.e., to increase an exposure time. However, increasing an exposure time beyond a certain level may cause significant or complete saturation of some of the pixels in the spectrometer's detector array regardless of whether there is workpiece surface located to produce a corresponding wavelength, or not. Saturation may be caused by internal (self) reflections within the CRS system, for example at various optical fiber coupling sections within the system such as at fiber couplers/connectors, fiber splitters and fiber ends. Pixels saturated to at least a "saturation threshold" level cannot provide a valid wavelength peak signal, due to insufficient peak height to support an accurate peak location estimate. If a workpiece surface is located at a distance at which a specific wavelength is focused and reflected back to a corresponding pixel that is significantly or fully saturated, then the system is unable to measure the distance. Thus, operation of CRS systems is currently limited by a maximum exposure time which is selected to avoid detector pixel saturation at or beyond a saturation threshold level (e.g., 80%-90% of complete saturation at the upper signal limit, or more), which may correspond to a minimum sampling rate beyond which the sampling rate cannot be lowered. A typical minimum sampling rate is about 300 Hz. Accordingly, there currently is no solution or feature which can be used by relatively unskilled users of CRS systems to measuring a workpiece surface that has insufficient reflectivity and produces a significant wavelength peak when using a CRS maximum exposure time which is selected to avoid significant detector pixel saturation.

Various aspects of the present invention are directed to overcoming the technical problem or limitation described above.

According to embodiments of the present invention, a method for operating a CRS system to perform a workpiece height measurement of a low reflectivity workpiece surface is provided. In one embodiment, the CRS system may comprise a chromatic point sensor (CPS) system including an optical pen. In one aspect, the CRS system includes high sensitivity measurement mode in which the CRS system can be operated at a lower sampling rate (lower than conventionally available sampling rates) to measure a workpiece surface having low reflectivity. The CRS system operated at such lower sampling rate (i.e., using a longer, self-saturating exposure time) causes one or more of its detector pixels to be saturated at or beyond a saturation threshold level, but is still capable of detecting a valid wavelength peak indicative of a height measurement for the workpiece surface when the workpiece surface is located in a valid subset of a nominal total measurement range of the CRS system that excludes an invalid peak portion corresponding to the one or more detector pixels saturated at or beyond a saturation threshold level by the self-saturating exposure time.

Specifically, in accordance with one aspect, a method is provided for operating a CRS system to perform a workpiece height measurement of a low reflectivity workpiece surface. The method includes generally three steps. First, a CRS is provided, which produces a valid wavelength peak throughout a nominal total measurement range that is uninterrupted between nominal upper and lower measurement range limits when operated using an exposure time that is within a first nominal range of exposure times. Second, the CRS is operated using a self-saturating exposure time that is longer than exposure times in the first nominal range of exposure times. Regardless of whether a workpiece surface is located in the nominal total measurement range or not, the self-saturating exposure time saturates at least one detector pixel of the CRS at or beyond the saturation threshold level, which prevents a valid wavelength peak in an invalid peak portion of the nominal total measurement range corresponding to the at least one detector pixel saturated at or beyond the saturation threshold level by the self-saturating exposure time, leaving valid wavelength peak measurement positions only in a valid subset of the nominal total measurement range that excludes the invalid peak portion. Third, on a user interface portion (e.g., a screen) of the CRS, an indication is provided of at least one of (a) a height measurement for a workpiece surface based on using the self-saturating exposure time, and/or (b) valid peak measurement positions included in the valid subset of the nominal total measurement range that corresponds to using the self-saturating exposure time.

In accordance with another aspect, a CRS system is provided for performing a workpiece height measurement of a low reflectivity workpiece surface. The CRS system includes an optics portion, an electronics portion, and a user interface portion. The optics portion is configured to focus different wavelengths at different distances along a measurement axis proximate to a workpiece surface to be measured, and to direct reflected radiation from the workpiece surface to a wavelength detector. The electronics portion includes the wavelength detector and is configured to provide, (a) when the CRS system is operated using an exposure time that is within a first nominal range of exposure times, a valid wavelength peak throughout a nominal total measurement range that is uninterrupted between nominal upper and lower measurement range limits, and (b) when the CRS system is operated using a self-saturating exposure time that is longer than exposure times in the first nominal range of exposure times, no valid wavelength peak in an invalid peak portion of the nominal total measurement range corresponding to one or more detector pixels that are saturated at or beyond a saturation threshold level by the self-saturating exposure time, regardless of whether the workpiece surface is located in the nominal total measurement range or not, leaving valid wavelength peak measurement positions only in a valid subset of the nominal total measurement range that excludes the invalid peak portion. The user interface portion is configured to provide an indication of at least one of (i) a height measurement for a workpiece surface located within the valid subset of the nominal total measurement range based on using the self-saturating exposure time, and/or (ii) valid peak measurement positions included in the valid subset of the nominal total measurement range that corresponds to using the self-saturating exposure time.

BRIEF DESCRIPTION OF THE SEVERAL VIEWS OF THE DRAWINGS

The foregoing aspects and many of the attendant advantages of this invention will become more readily appreciated as the same become better understood by reference to the following detailed description, when taken in conjunction with the accompanying drawings, wherein:

FIG. 4B is an example CRS distance calibration lookup table, which references wavelength peak pixel coordinates to corresponding measurement distances.

FIGS. 5A-5E show one way of representing respective self-saturation profiles corresponding to operating a CRS at five corresponding "high sensitivity" sampling rates (which provide relatively long exposure times) when no measurement surface is present. Each self-saturation profile indicates a valid subset of the nominal total measurement range where distance measurement is possible at a "high sensitivity" sampling rate. Some of the self-saturation profiles show a complementary invalid peak portion of comprising detector pixels saturated at or beyond the saturation threshold level, for those sample rates that correspond to a self-saturating exposure time.

FIGS. 6A and 6B show exemplary user interface display embodiments illustrating user-selectable options (e.g., sampling rates) in one embodiment of a basic setting (FIG. 6A) and user-selectable options (e.g., sampling rates and display of corresponding self-saturation profiles) in one embodiment of a high sensitivity setting (FIG. 6B) offering extended options for low reflectivity workpieces.

DETAILED DESCRIPTION

Figure 1:
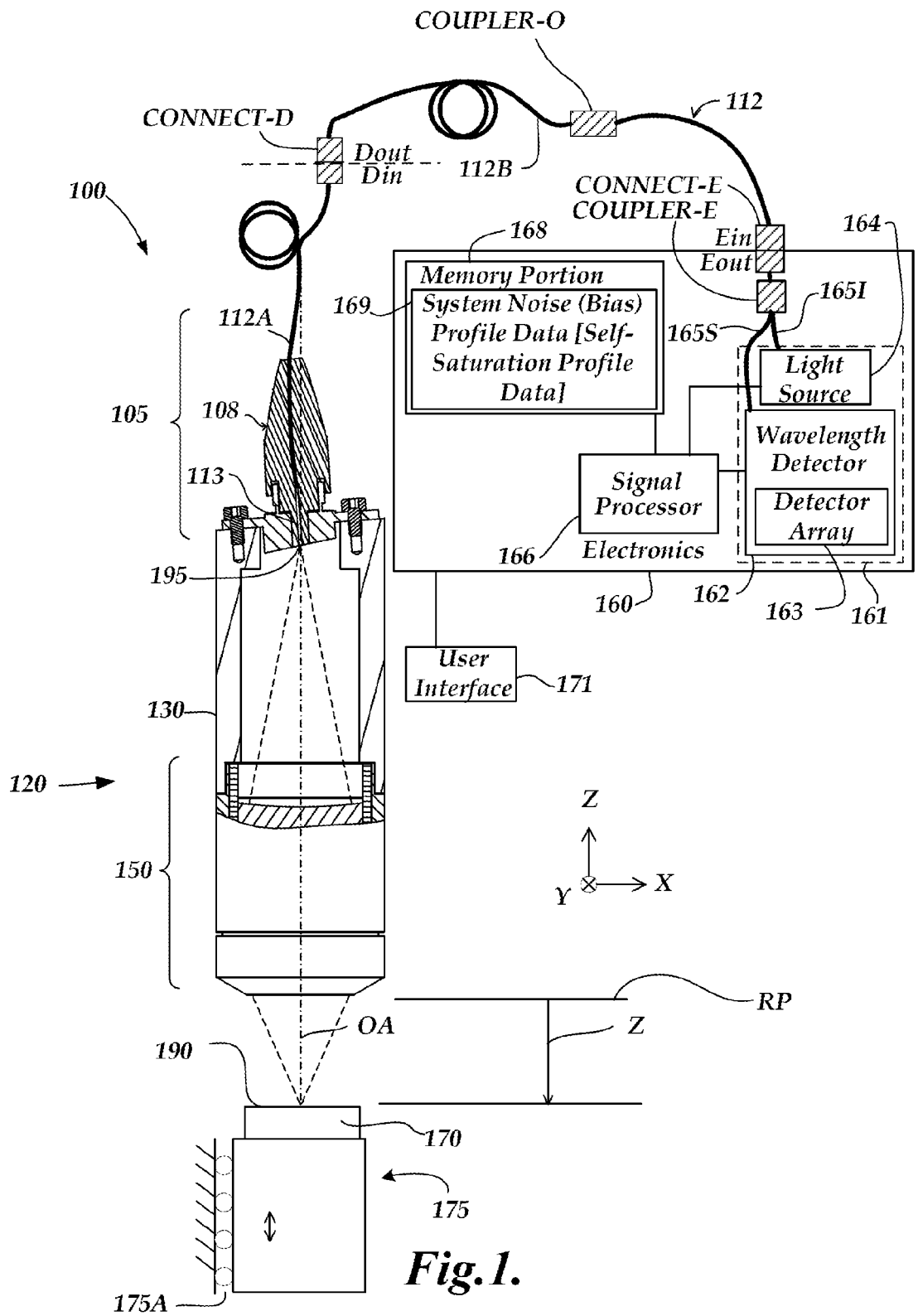
FIG. 1 is a block diagram of one embodiment of an exemplary CRS system.

FIG. 1 is a block diagram of one exemplary embodiment of a chromatic range sensor (CRS) system 100, including an optical element 120 (e.g., an optical pen), an electronics portion 160, and a user interface portion 171. The embodiment of the electronics portion 160 includes a signal processor 166, a memory portion 168 and a source and detector subsystem 161 comprising a wavelength detector 162, and a broadband light source 164. The CRS system 100 shown in FIG. 1 is a chromatic point sensor (CPS) system which measures a single measurement point at a time. In various embodiments, the wavelength detector 162 includes a detector array 163 of a spectrometer. The detector array 163 may comprise a plurality of pixels distributed along a measurement axis of the wavelength detector 162, wherein the plurality of pixels receive respective wavelengths and provide output spectral profile data. The electronics portion 160 is coupled to the optical element 120 through an optical path including a fiber optic cable 112. Optional or alternative aspects of the optical path are shown, including the fiber optic cable 112 having first and second segments 112A and 112B joined at a connector CONNECT-D in the fiber optic segment 112B, and a coupler COUPLER-O which joins the segment 112B to the electronics portion 160. The light source 164, which is controlled by the signal processor 166, is connected to input a spectral profile of wavelengths to the optical element 120 through a path including the illumination fiber segment 165I, the 2×1 coupler COUPLER-E, CONNECT-E, and the fiber optic cable 112. The optical element 120 includes an in/out fiber optic sub-assembly 105, a housing 130, and an optics portion 150. The in/out fiber optic sub-assembly 105 comprises an in/out optical fiber 113 carried through the fiber optic cable 112 which encases it, and a fiber optic connector 108. The in/out optical fiber 113 outputs an output beam through an aperture 195, and receives reflected measurement signal light through the aperture 195.

In operation, light emitted from the fiber end through the aperture 195 is focused by the optics portion 150, which includes a lens that provides an axial chromatic dispersion such that the focal point along the optical axis OA is at different distances depending on the wavelength of the light, as is known for CRS systems. During measurement operations, the light is focused on a surface location 190 of a workpiece 170. Light reflected from the surface location 190 is refocused by the optics portion 150 onto the aperture 195. Due to its axial chromatic dispersion, only one wavelength will have the focus distance that matches the measurement distance "Z", which is the distance from a reference position RP that is fixed relative to the optical element 120 to the surface location 190. The wavelength that is best focused at the surface location 190 is the best focused wavelength at the aperture 195. Thus, predominantly the best focused wavelength passes through the aperture 195 and into the core of the optical fiber 113 of the fiber optic cable 112. The fiber optic cable 112 routes the signal light to a wavelength detector 162 that is utilized for determining the wavelength having the dominant intensity, which corresponds to the measurement distance Z to the surface location 190.

In the illustrated embodiment, the reflected wavelength-dependent light intensity passes back to the electronics portion 160 through the fiber optic path including the coupler COUPLER-E so that approximately 50% of the light is directed through the signal fiber segment 165S to the wavelength detector 162. The wavelength detector 162 receives the wavelength-dependent light intensity, converts it to an output spectral intensity profile (also referred to simply as an output spectral profile) distributed over an array of pixels along a measuring axis of the detector array 163, and operates to provide corresponding output spectral profile data based on pixel data output from the detector array 163.

The subpixel-resolution distance-indicating coordinate (DIC) of the profile data (see FIG. 3) is calculated by the signal processor 166, and the DIC (in subpixels) determines the measurement distance Z to the surface location 190 (in microns) via a distance calibration lookup table or the like, which is stored in the memory portion 168, as described below with respect to FIGS. 4A and 4B. The DIC may be determined by various methods (e.g., by determining the centroid of intensity profile data included in a peak region). The profile data may be used to determine the DIC with subpixel resolution as described below.

The user interface portion 171 is coupled to the electronics portion 160 and is configured to receive user input used for the operation of the CRS system 100, such as a user command to obtain a system noise (bias) profile of the CRS system 100, user selection of sampling rates or other operating parameters, etc., via any suitable means such as a keyboard, touch sensor, mouse, etc. The user interface portion 171 is also configured to display information on a screen, such as a distance successfully measured by the CRS system 100. The user interface portion 171 may also display valid peak measurement positions in a valid subset of a nominal total measurement range of the CRS system 100 (corresponding to operating at a lower or "high sensitivity" sampling rate) to guide the user to locate a low reflectivity workpiece surface within the valid subset to perform a distance measurement, as described below.

FIG. 1 includes orthogonal XYZ coordinate axes, as a frame of reference. The Z direction is defined to be parallel to the optical axis (OA), which is the distance-measuring axis, of the optical element 120. As illustrated in FIG. 1, during operation, the workpiece 170 is placed along the optical axis OA, and may be mounted on a translation stage 175 which may be advantageously aligned such that it translates along the Z axis direction constrained by guide bearings 175A.

Figure 2:
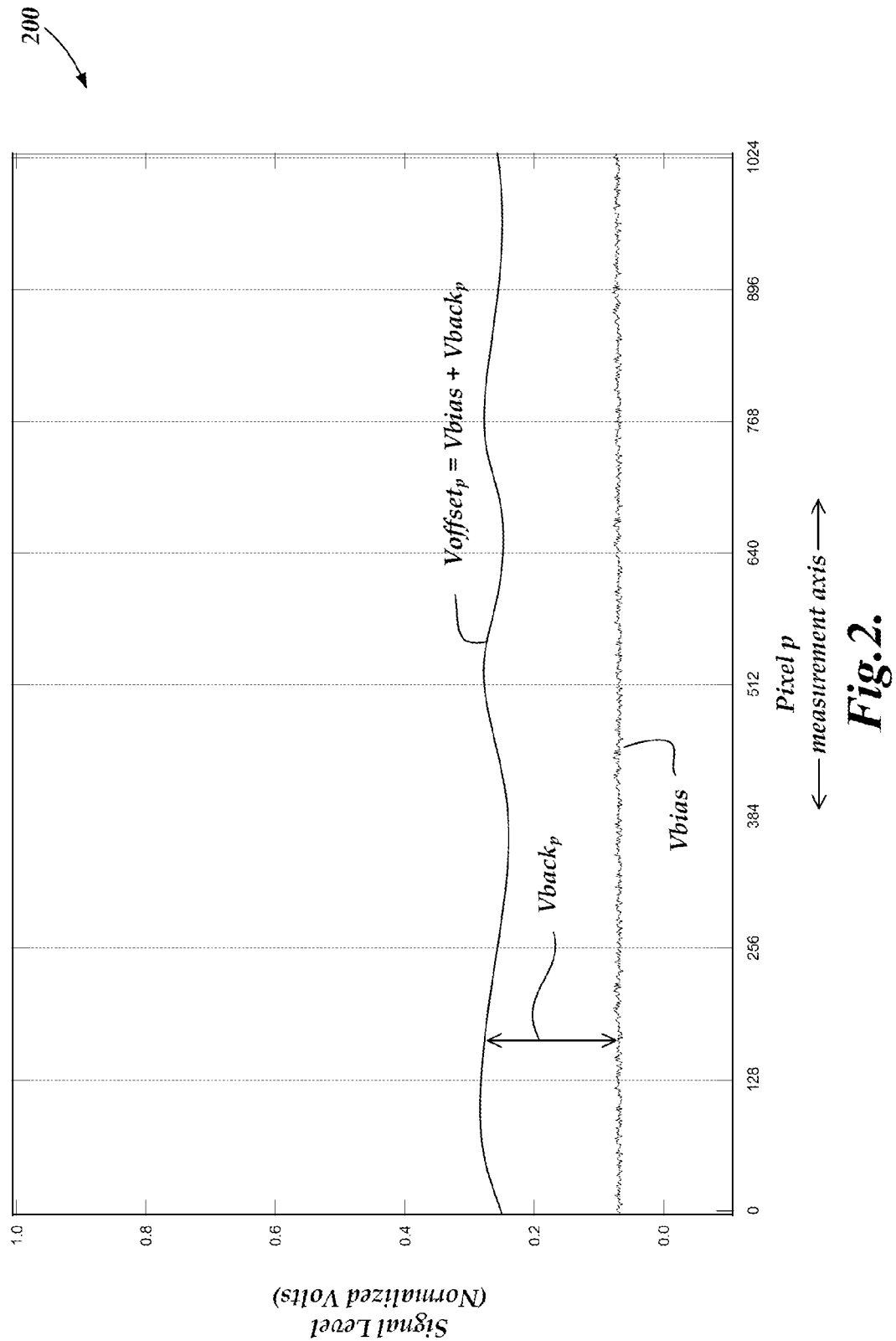
FIG. 2 is a diagram of a system noise (bias) profile from a CRS illustrating wavelength-dependent voltage offset signal levels for the pixels in a detector array when no measurement surface is present.

The following description of FIG. 2 outlines certain known background signal processing and/or calibration operations that may be used in combination with this invention, in various embodiments. The purpose is to emphasize that the inventive methods disclosed further below are distinct from, but compatible with, these operations. FIG. 2 is a diagram 200 of a system noise (bias) profile from a CRS illustrating voltage offset signal levels Voffset(p) for the pixels in a detector array 163 when no measurement surface is present within the nominal total measurement range of the CRS. In such a case, there is no intentionally reflected light and no significant or dominant wavelength peak in the resulting intensity profile. The voltage offset signal Voffset(p) is plotted in normalized volts, for each of 1,024 pixels along the "wavelength" measurement axis. "Normalized volts" assigns a value of 1.0 to the saturation voltage of the detector array 163. The voltage offset signal Voffset(p) includes a bias signal level Vbias, which is relatively consistent across the detector array, and a background signal component Vback(p), which is shown as varying across the detector array. The coordinate-independent bias signal level Vbias may change as a result of voltage drifts associated with ambient temperature changes and heat generated by the electronics portion 160 during operation. The variable background signal Vback(p) represents signals such as background light from wavelength-dependent spurious (internal) reflections in the CRS, as well as due to the dark current of the various pixels p. Weak but significant internal reflections may arise, for example at optical fiber coupling sections, such as fiber optic couplers and connectors, fiber optic splitters and fiber optic ends. Each CRS system also typically includes wavelength-dependent variations in the CRS spectrometer response and/or the CRS broadband light source, which actually produces different intensities at different wavelengths. Thus, in various embodiments, to provide the best possible signal calibration or compensation a system noise (bias) profile of the CRS may be obtained at various times during operation to track dynamic variations in the potential signal error components outlined above. Specifically, the signal components Vback(p) may be stored as system noise (bias) profile data 169 for calibration or compensation of the pixel array of the detector array 163. The system noise (bias) profile data 169 may be used to compensate subsequent profile data signals from each pixel p (e.g., by subtraction) on an ongoing basis.

In accordance with various aspects of the invention, a system noise (bias) profile of the CRS operated at a relatively low sampling rate (or long exposure time) may be used to build a self-saturation profile of the CRS at that sampling rate. A self-saturation profile indicates pixels saturated at or beyond a saturation threshold level, and conversely valid peak measurement positions included in a valid subset of a nominal total measurement range of the CRS along the optical axis OA of the CRS, where a distance measurement is still possible at that (relatively low) sampling rate. In other words, the valid subset of measurement positions (e.g., in microns) corresponds to the subpixel DIC locations where remaining "unsaturated" detector array pixels (those that are not saturated beyond the saturation threshold level) are still capable of producing a valid wavelength peak even at that low sampling rate, as will be more fully described below.

Figure 3:
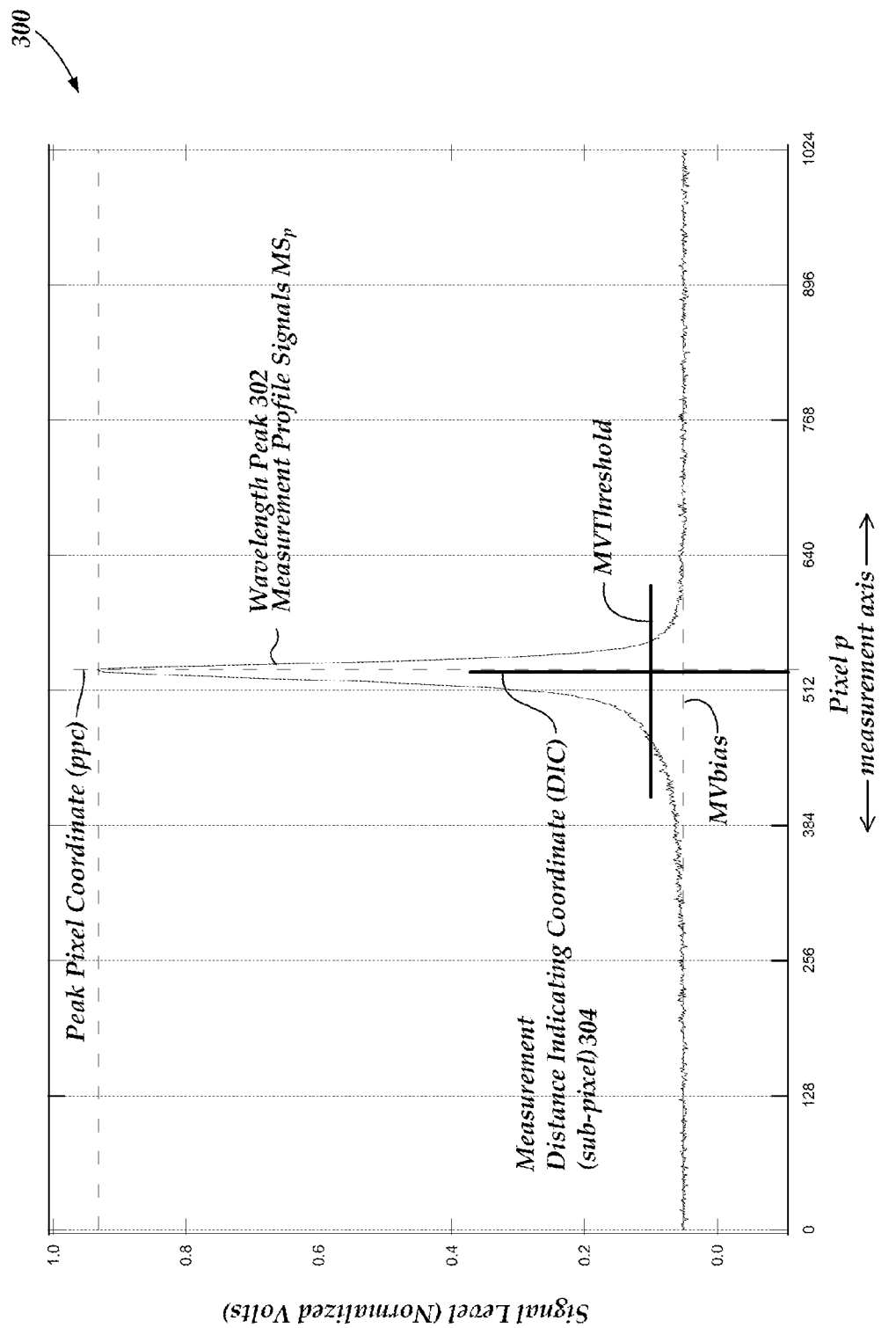
FIG. 3 is a diagram of a wavelength-dispersed intensity profile from a CRS illustrating a valid wavelength peak produced by a wavelength reflected by a measurement surface, wherein the pixel position of the peak corresponds to a measured distance to the measurement surface.
Figure 4A:
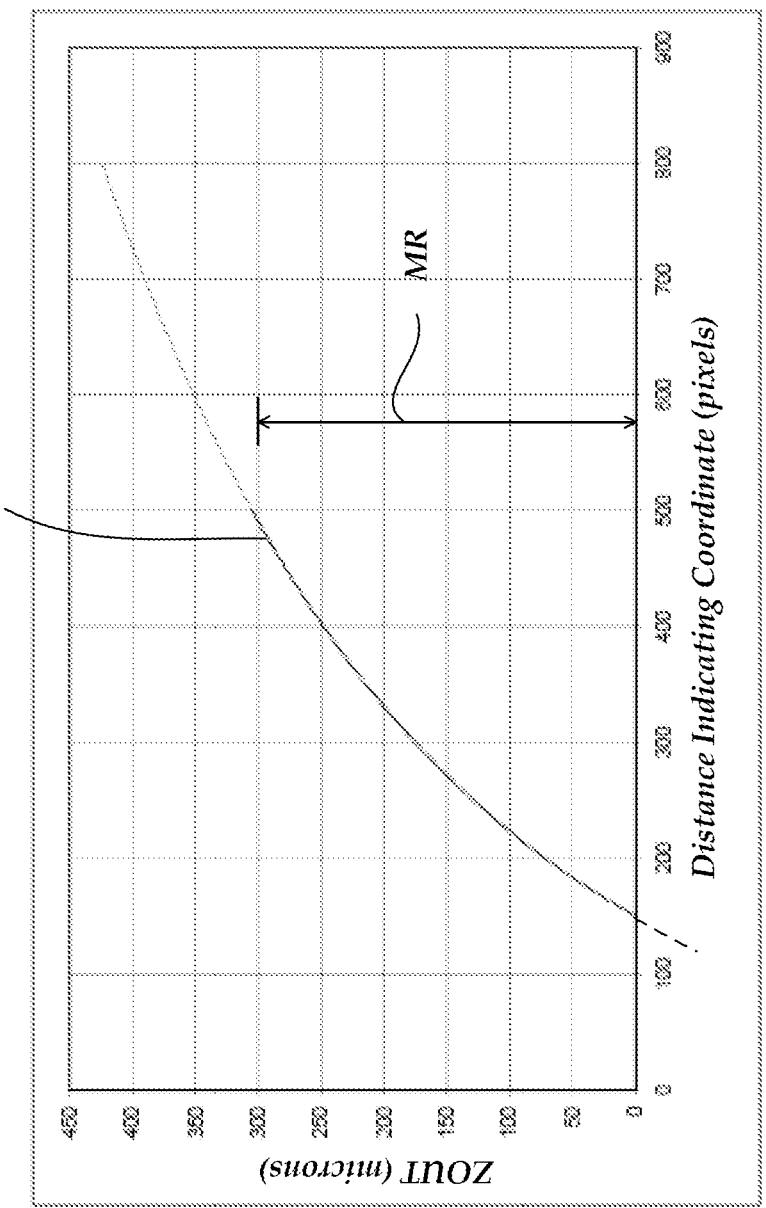
FIG. 4A is a diagram of CRS distance calibration data, which correlates distance-indicating (wavelength peak) pixel coordinates with known measurement distances to a measured workpiece surface.

The following description of FIGS. 3, 4A and 4B outlines certain signal processing operations that determine distance-indicating coordinates (DIC) with subpixel resolution based on a valid wavelength peak produced in a wavelength-dispersed intensity profile from a CRS, and determine a measurement distance to a workpiece surface (e.g., in microns) based on the determined DIC. The operations outlined here are described in more detail in the '456 patent. The purpose of this description is to provide background information which is useful for an overall understanding of CRS distance measurement operations.

FIG. 3 is a diagram 300 of a wavelength-dispersed intensity profile from a CRS illustrating a valid wavelength peak 302 produced by a subset of measurement profile signals MS(p) indicative of a wavelength focused on and reflected by a measurement surface. Each of the measurement profile signals MS(p) has the signal level (shown in normalized volts) associated with each pixel p of the detector array (e.g., the detector array 163). The valid wavelength peak 302 has no pixels saturated at or beyond the saturation threshold level. It also has more than sufficient height (a good signal to noise ratio), is relatively symmetric, and allows a good estimation of the peak location or measurement distance-indicating coordinate (DIC) 304 along the measurement axis of the detector array.

FIG. 3 shows a bias signal level MVbias (in normalized volts), a peak pixel coordinate (ppc), and a data threshold MVthreshold that defines the lower limit of a distance-indicating subset of measurement profile signals MS(p) forming the wavelength peak 302. All "MV" values are in normalized volts.

Briefly, in one embodiment, measurement operations for determining a distance-indicating coordinate (DIC) (in pixels) and determining a corresponding measurement distance (in microns) based on the determined DIC may include the following:

Position the target surface along the optical axis OA, and capture the resulting wavelength-dispersed intensity profile as in the diagram 300.

Determine the peak pixel coordinate (ppc), which is the pixel that has the highest signal.

Determine the measurement bias signal level MVbias at a given sampling rate.

Determine the data threshold MVthreshold (e.g., as a percentage of the peak height).

Determine the distance-indicating coordinate (DIC) with sub-pixel resolution, based on the distance-indicating subset of measurement profile signals MS(p) forming the wavelength peak that has a value greater than MVthreshold.

Determine the measurement distance by correlating the DIC with a corresponding distance in the stored distance calibration data (e.g., a distance calibration curve as in FIG. 4A or a lookup table as in FIG. 4B).

In the foregoing operations, a DIC may be determined with sub-pixel resolution, based on the distance-indicating subset of measurement profile signals MS(p) above MVthreshold. A DIC may be determined by various methods. In one embodiment, a DIC may be determined as the subpixel-resolution coordinate of a centroid $X_C$ of the distance-indicating subset of signals MS(p). For example, for a detector with 1024 pixels, the centroid $X_C$ may be determined according to:

$$X_C = \frac{\sum_{p=1}^{1024} p(S_M(p))^n}{\sum_{p=1}^{1024} (S_M(p))^n} \quad \text{(Eq. 1)}$$

where, $$S_M(p) = \quad \text{(Eq. 2)}$$
$$\begin{Bmatrix} MS_p - MVThreshold(ppc), \text{ for } MS_p \geq MVThreshold(ppc) \\ 0, \text{ for } MS_p < MVTThreshold(ppc) \end{Bmatrix}$$

In one specific example, n=2, in EQUATION 1. It will be appreciated that EQUATION 2 restricts the signals MS(p) used in the centroid calculation to a distance-indicating subset.

FIG. 4A is a diagram 400A of CRS measurement distance calibration data 410A which correlates distance-indicating coordinates (DIC) with sub-pixel resolution to known measurement distances (ZOUT) in microns along the optical axis (OA) of the CRS. The example shown in FIG. 4A is for an optical element having a nominal total measurement range MR of 300 microns, which corresponds to DICs in the range of approximately 150 pixels-490 pixels. However, the CRS may be calibrated over a larger pixel range of the detector array 163, if desired. One exemplary laboratory calibration method to determine the CRS measurement distance calibration data 410A employs a mirror (e.g., substituting for the surface at the surface location 190 of FIG. 1) moved along the optical axis OA (e.g., in approximately 0.1 or 0.2 micron steps). For each actual mirror position, the corresponding calibration DIC of the CRS system is determined based on the corresponding intensity profile data as described above. The calibration DIC and the corresponding actual position (in microns along the optical axis OA) are then recorded to provide the calibration data 410A. During a workpiece measurement operation, the measurement DIC obtained by a CRS system is referenced to the stored calibration data 410A to determine the measurement distance ZOUT corresponding to the measurement DIC.

FIG. 4B is a diagram 400B of a lookup table form of calibration data analogous to that outlined above. It is intended to show one schematic representation of a lookup table format, and differences in the specific table values of FIG. 4B from those indicated in the specific calibration data 410A of FIG. 4A, are not significant or relevant for this purpose. In FIG. 4B, in the left column the calibration DICs entries cover the pixel coordinates from 1 to 1,024, in increments of 0.1 pixel steps, and in the right column the corresponding measurement distances (in microns) are entered. In operation, the measurement DIC calculated by the CRS system is referenced to the stored calibration lookup table in order to determine the corresponding measurement distance (in microns). If the measurement DIC falls between adjacent calibration DIC values, then the measurement distance may be determined by interpolation.

As described previously, when a CRS system is operated with a longer exposure or integration time (i.e., at a lower sampling rate), even when a measurement surface is not present, some pixels in the detector array may be self-saturated at or beyond a saturation threshold level due to light arising from internal reflections (e.g., from fiber connectors, fiber splitters, fiber ends and the like). According to various embodiments of the invention, a method of operating a CRS system includes determining a self-saturation profile of the CRS system operated at a certain (relatively low) sampling rate, which indicates a valid subset of a nominal total measurement range of the CRS along the optical axis OA, which corresponds to DIC pixel positions where the pixels are not saturated at or beyond the saturation threshold level (despite the low sampling rate) and thus are capable of producing a valid wavelength peak. That is, a valid wavelength peak cannot be formed by a pixel saturated at or beyond the saturation threshold level and, thus, the valid subset of a nominal total measurement range of the CRS corresponds to DIC pixel positions that exclude pixels saturated at or beyond the saturation threshold level (e.g., 80%-90% of complete saturation at the upper signal limit, or more). A user can therefore perform a distance measurement of a workpiece surface at such a low sampling rate, by placing the workpiece surface in the valid subset of the nominal total measurement range of the CRS system along the optical axis.

FIGS. 5A-5E show one way of representing respective self-saturation profiles corresponding to operating a CRS at five corresponding "high sensitivity" sampling rates (which provide relatively long exposure times) when no measurement surface is present. Each self-saturation profile may be determined based on a system noise or bias profile (e.g., according to previously outlined principles) and indicates a valid subset of the nominal total measurement range where distance measurement is possible at a corresponding "high sensitivity" sampling rate. Conversely, some of the self-saturation profiles may also be considered to show a complementary invalid peak portion of the nominal total measurement range corresponding to at least one detector pixel saturated at or beyond a saturation threshold level, for those sample rates that correspond to a self-saturating exposure time.

Each of FIGS. 5A-5E show graphs 500A-500E, respectively, which have: a horizontal axis depicting a nominal total measurement range of the CRS along the optical axis of the CRS of about 0 μm-1200 μm; a vertical axis indicating the available measurement signal range at each position (or corresponding detector pixel) as described in detail below; a minimum measurement peak height threshold TH which allows a sufficiently accurate estimate of a wavelength peak location or DIC, and an illustrative fictitious wavelength peak 590 corresponding to the peak height threshold TH. In the illustrated example, TH is approximately 300 signal units.

The nominal total measurement range (e.g., 0 μm-1200 μm) is the specified uninterrupted measurement range of the CPS provided when using a conventional exposure time that is within a nominal range of exposure times (e.g., a nominal exposure time corresponding to a sampling rate of 300 Hz, or greater). Under such conditions, it is relatively certain that no detector pixels are saturated at or beyond the saturation threshold level by internal reflections and a valid wavelength peak (e.g., with a height exceeding the minimum measurement peak height threshold TH) and distance measurement may be provided throughout the specified measurement range. As described previously in relation to calibration data, distance-indicating coordinates (DIC) in pixels along the measurement axis of the detector array correspond to measurement positions in microns along the optical axis OA of the CRS system. Thus, in various descriptions herein measurement positions (along the optical axis) and pixel positions (along the detector measurement axis) and may be interchangeably or synonymously used, unless one of them is specifically called for.

The available measurement signal range shown along the vertical axis at each position may be regarded, in various embodiments, as the available measurement signal at the detector pixel corresponding to that position or wavelength after subtracting all internal bias signal contributions (e.g., the signal contribution from spurious internal reflections) from its maximum (or fully saturated) signal level. In various embodiments, a "self-saturation" signal threshold, or saturation threshold, for short (not shown), is the level which, if subtracted from the maximum signal level, leaves an insufficient remaining available signal level to register a valid wavelength peak signal—e.g., a peak higher than the minimum measurement peak height threshold TH, which can be used to accurately estimate the peak wavelength location or DIC. In some embodiments, the sum of the self-saturation signal threshold and the minimum measurement peak height threshold TH is approximately equal to the maximum signal level for a detector pixel. In other words, in some embodiments, subtracting a self-saturation signal at or exceeding the saturation threshold from the potential maximum signal leaves a remaining available signal at or below the minimum measurement peak height threshold TH. In some embodiments, the (self) saturation threshold may be set at 80%-90% of complete saturation at the upper signal limit, or more. Conversely, in some embodiments, the minimum measurement peak height threshold TH (for the remaining available signal at a pixel) may be set at 20% of the upper signal limit, or 10%, or less. However, these threshold values are exemplary only, and not limiting. In various embodiments, a saturation threshold and/or the minimum measurement peak height threshold TH, may be chosen at a desired level in view of various technical considerations such as available signal levels, desired tolerance for reading errors, noise considerations, expected workpiece reflectivity ranges, and the like.

In each graph 500A-500E a "self-saturation" profile line 595 (e.g., 595A-595E) shows the variation in the signal range available for registering the signal contribution of light reflected from a workpiece surface, without fully saturating the output of the corresponding detector pixel, for various measurement positions throughout the nominal total measurement range. One major reason the profile lines 595 vary between graphs is because their respective sample rates and/or corresponding exposure time affects the accumulated amount of spurious internally reflected light that contributes to their respective bias signals. The units of the vertical axis may be considered to be any convenient characterization of photodetector signal units (e.g., a digital signal representing signal volts, or intensity units, or the like.)

The five "high sensitivity" sampling rates shown in FIGS. 5A-5E are relatively lower than conventional sampling rates used with a CRS, in order to produce a longer exposure time to obtain a sufficient wavelength peak signal from a low reflectivity surface. It will be appreciated that the self-saturation profiles 595A-595E are intended to be instructional and qualitatively illustrative, and the invention is not limited to the specific embodiments or signal behavior depicted in FIGS. 5A-5E.

Referring to FIG. 5A, the graph 500A shows a self-saturation profile 595A of a CRS operated at a sampling rate of 100 Hz, which shows that for this particular sample rate in this particular CRS system there is sufficient signal range (e.g., greater than TH) available for registering the signal contribution of light reflected from a workpiece surface for all measurement positions throughout the nominal total measurement range. For example, a signal or wavelength peak at high as 591 could be registered, without fully saturating detector pixels, at a wavelength corresponding to a position of approximately 25 μm. Similarly, a signal peak at high as 592 could be registered, without fully saturating detector pixels, at a wavelength corresponding to a position of approximately 990 μm. The self-saturation profile 595A indicates that for a sampling rate of 100 Hz (or its corresponding exposure time), no detector pixels are actually "self-saturated" (e.g., having a remaining available signal range at or below the minimum measurement peak height threshold TH) by this CRS system, and there is no invalid peak portion of the nominal total measurement range. Thus, for a 100 Hz sample rate, the valid subset 502A of the nominal total measurement range where distance measurement is possible comprises the entire nominal total measurement range.

It will be understood that the hypothetically available measurement signal peak height at 100 Hz (e.g., as reflected by the self-saturation profile 595A) may be less than it would be at a conventional sample rate (e.g., at 300 Hz or more). However, the signal peak height actually obtained from a low reflectivity surface will be higher at the slower sample (e.g., exceeding TH), because the exposure time for accumulating the weak measurement signal will be longer. Even though it does not actually "self-saturate" at or beyond a saturation threshold level in this example, a sample rate of 100 Hz might not be included in the range of nominal or conventional sample rates for a CRS system because the signals from various normal or high reflectivity surfaces may present a high risk for saturating wavelength peak pixels at that sample rate, which may prevent accurate estimation of the wavelength peak location DIC for surfaces having normal or high reflectivity.

Referring to FIG. 5B, the graph 500B shows a self-saturation profile 595B of a CRS operated at a sampling rate of 60 Hz, which shows that for this particular sample rate in this particular CRS system the signal range available for registering the signal contribution of light reflected from a workpiece surface for measurement positions is less than at 100 Hz as expected. In particular, the available signal range drops to around the minimum level TH in the vicinity of the zero measurement position (that is, in the invalid peak portion 504B). For this reason, for a 60 Hz sample rate, it may be prudent to limit the valid subset 502B of the nominal total measurement range where distance measurement is possible to include a single continuous subset over most of the nominal total measurement range but exclude positions in the vicinity of the zero measurement position.

Referring to FIG. 5C, the graph 500C shows a self-saturation profile 595C of a CRS operated at a sampling rate of 50 Hz. This is very close to the sample rate of 60 HZ shown in FIG. 5B, and the results are similar. For this particular sample rate in this particular CRS system the signal range available for registering the signal contribution of light reflected from a workpiece surface for measurement positions is slightly less than at 60 Hz as expected. The available signal range drops below the minimum level TH in the vicinity of the 0 μm-10 μm measurement positions (that is, in the invalid peak portion 504C). For this reason, for a 50 Hz sample rate, it may be prudent to limit the valid subset 502C of the nominal total measurement range where distance measurement is possible to include a single continuous subset over much of the nominal total measurement range but exclude positions in the vicinity of the 10 μm measurement position and below.

Referring to FIG. 5D, the graph 500D shows a self-saturation profile 595D of a CRS operated at a sampling rate of 35 Hz. For this particular sample rate in this particular CRS system the signal range available for registering the signal contribution of light reflected from a workpiece surface for measurement positions is significantly less than at 50 Hz. The available signal range drops below the minimum level TH in the vicinity of the 0 μm-75 μm measurement positions (invalid peak portion 504D), and in the vicinity of the 640 μm-920 μm measurement positions (invalid peak portion 504D'). For this reason, for a 35 Hz sample rate, it may be prudent to limit the valid subset of the nominal total measurement range where distance measurement is possible to the two portions 502D and 502D', and exclude positions in the invalid peak portions 504D and 504D'.

Referring to FIG. 5E, the graph 500E shows a self-saturation profile 595E of a CRS operated at a sampling rate of 25 Hz. For this particular sample rate in this particular CRS system the signal range available for registering the signal contribution of light reflected from a workpiece surface for measurement positions is then significantly less than at 35 Hz. The available signal range drops below the minimum level TH over the majority of the nominal total measurement range (that is, over the invalid peak portion 504E). In fact, in this case, the pixels throughout much of the invalid peak portion 504E are completely self-saturated (e.g., from 400 μm-960 μm measurement positions). For a 25 Hz sample rate, it may be prudent to limit the valid subset of the nominal total measurement range where distance measurement is possible to the portion 502E, and exclude positions in the invalid peak portion 504E.

According to various embodiments of the invention, a CRS may be operated in two different settings—a basic setting (first normal operating mode) and a high sensitivity setting (second high-sensitivity operating mode). FIGS. 6A and 6B show exemplary user interface display embodiments illustrating user-selectable options (e.g., sampling rates) in one embodiment of a basic setting (FIG. 6A) and user-selectable options (e.g., sampling rates and display of corresponding self-saturation profiles) in one embodiment of a high sensitivity setting (FIG. 6B) offering extended options for low reflectivity workpieces. The user interface display embodiments shown in FIGS. 6A and 6B may be shown on the user interface portion 171 of the CRS system, usable in the basic setting and the high sensitivity setting, respectively. Under the basic setting user interface tab 601 as shown in FIG. 6A, a user may be given a set of selectable sampling rates 602 including conventionally available sampling rates, such as 300 Hz, 500 Hz, 1000 Hz, 1500 Hz, and 2000 Hz as illustrated. These sampling rates respectively correspond to exposure times within a nominal range of exposure times that are usable for "normal reflectivity" workpieces, and do not cause self-saturation of any of the detector array pixels. Thus, at any of these sampling rates selected by a user, the CRS system is capable of providing a valid wavelength peak throughout the entire nominal total measurement range of the CRS. The basic setting user interface also may include a system noise (bias) profile update button 604. The CRS system 100 obtains a system noise (bias) profile at the selected sampling rate (e.g., 1000 Hz in the example of FIG. 6A) in response to user selection of the update button 604, and stores the profile in the memory portion 168 for various calibration and compensation purposes, as described above.

When a user selects a high sensitivity setting tab 605, the high sensitivity setting user interface of FIG. 6B may be shown, which includes a different set of selectable sampling rates 612 including relatively lower sampling rates, such as 25

Hz, 35 Hz, 50 Hz, 60 Hz, 75 Hz and 100 Hz, than those available in the basic setting. These sampling rates respectively correspond to self-saturating exposure times that are longer than exposure times in the nominal range of exposure times. Thus, when operated at any of these relatively lower sampling rates, the CRS system will have a valid subset of a nominal total measurement range where a height (distance) measurement is possible with surfaces having a compatible low reflectance level. The valid subset of the nominal total measurement range excludes an invalid peak portion where a height measurement is not possible, as described above in reference to FIGS. 5A-5E. The high sensitivity setting user interface, similar to the basic setting user interface, may also include a system noise (bias) profile update button 614. The CRS system obtains a system noise (bias) profile at the selected relatively low sampling rate (e.g., 50 Hz in the example of FIG. 6B) in response to user selection of the update button 614. Furthermore, in the high sensitivity setting 605, the CRS system may determine a self-saturation profile (see FIGS. 5A-5E) based on or in conjunction with the system noise (bias) profile as described above, to determine a valid subset within a nominal total measurement range of the CRS. The CRS system obtains a self-saturation profile at the selected sampling rate in response to user selection of the update button 614 in the high sensitivity setting 605 and may store the self-saturation profile, or operating information derived therefrom, in the memory portion 168. In some embodiments, the system noise (bias) profile update button 614 in the high sensitivity setting 605, which obtains and stores a self-saturation profile based on or in conjunction with a system noise (bias) profile, appears the same as the system noise (bias) profile update button 604 in the basic setting 601, which obtains and stores only a system noise (bias) profile, such that any processing differences between the two settings are transparent to the user.

It will be appreciated that the sampling rates selectable in the basic setting 601 and the high sensitivity setting 605 are intended to be illustrative only, and not limiting. In various embodiments, any sampling rate at which a valid wavelength peak can be detected throughout a nominal total measurement range can be included in the basic setting sampling rate set 602, while any sampling rate at which at least some of the detector array pixels are self-saturated to at least a (self) saturation threshold level (regardless of whether a workpiece surface is present in the nominal total measurement range), while other pixels are not, can be included in the high sensitivity sampling rate set 612.

In some embodiments outlined above, the update button 604 or 614 triggers sampling of a system noise (bias) profile and/or a self-saturation profile at a current or selected sampling rate. In other embodiments, the update button 604 or 614 may trigger sampling of system noise (bias) profiles and/or self-saturation profiles for a set of sample rates including some or all potential sampling rates. Various such profiles (or operating information derived therefrom) may then be stored in the memory portion 168, so that when the user later selects one of the sampling rates, its corresponding profile is readily usable by the CRS. Both system noise (bias) profiles and self-saturation profiles of a CRS are susceptible to environmental variations, component aging, and other time-dependent changes. Thus, in various implementations, the CRS may prompt the user to select the update button 614 at various times to obtain at least the self-saturation profile of a current sampling rate, so that the profiles remain up-to-date.

Figure 7:
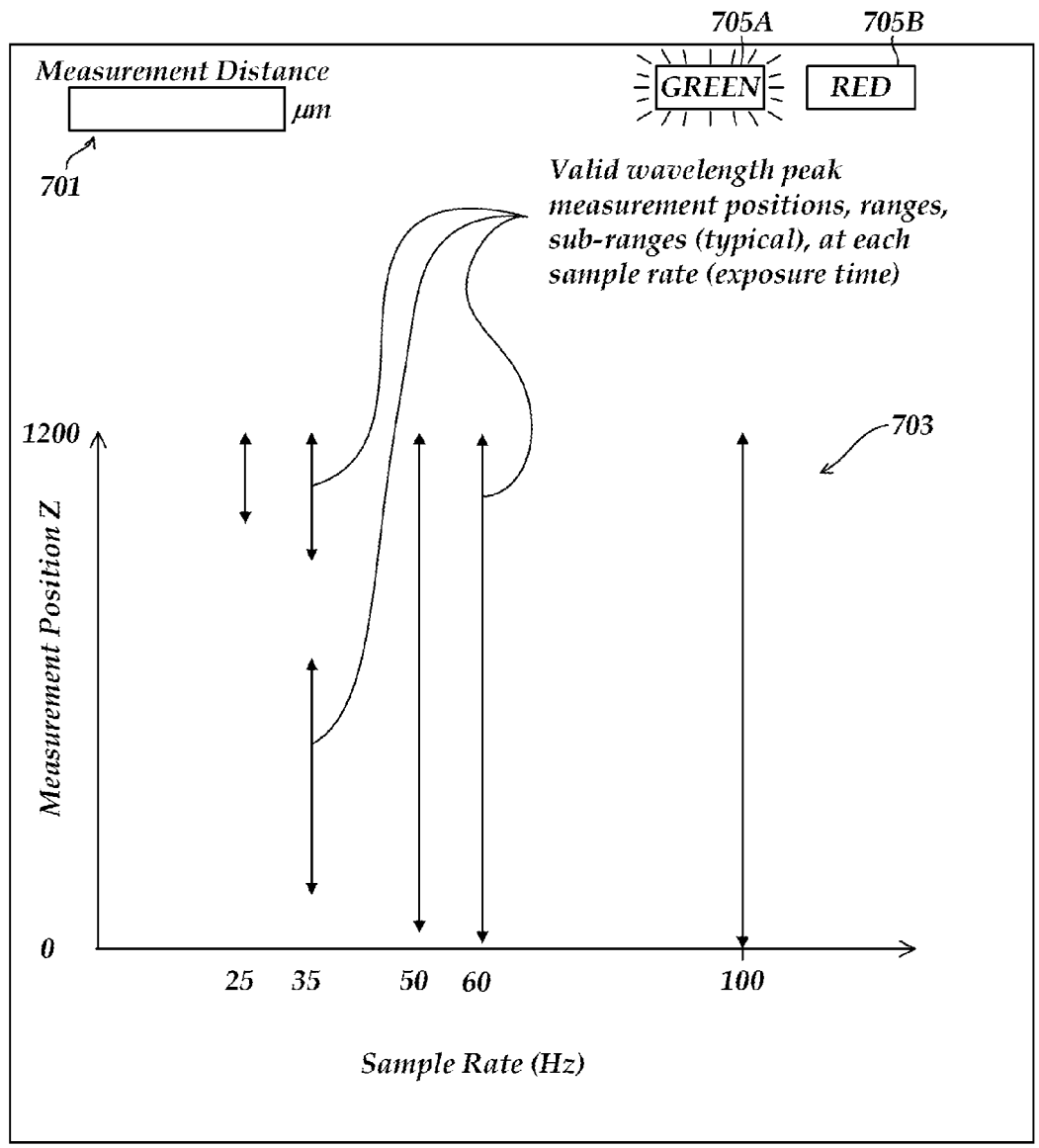
FIG. 7 shows an exemplary user interface display embodiment in the high sensitivity setting, which displays a measurement distance and/or valid peak measurement positions in valid subsets of a nominal total measurement range of a CRS corresponding to various sampling rates.

In the high sensitivity setting 605, a valid subset within a nominal total measurement range includes valid wavelength peak measurement positions along the optical axis OA of the CRS, as described above. Thus, if a workpiece surface to be measured happens to be located in the valid subset, reflection from the workpiece surface will produce a valid wavelength peak to thereby indicate a measurement distance to the workpiece surface. FIG. 7 shows an exemplary user interface display screen embodiment in the high sensitivity setting, which displays a measurement distance field 701 and/or potential valid peak measurement positions in a valid subset of a nominal total measurement range of a CRS corresponding to various sampling rates, in a valid subset display portion 703.

A successfully determined measurement distance may be displayed in the field 701, if the workpiece surface happens to be in a valid subset range. If not, at least initially the workpiece surface needs to be manually, semi-automatically or automatically moved to be located within a valid subset. To this end, a user may refer to the valid subset display portion 703 for guidance in locating the surface in a valid subset for a particular sample rate that is usable with the reflectivity characteristics of the surface. In some embodiments, the valid subset display portion 703 may be automatically displayed in the user interface portion 171 whenever a user performs a distance measurement in the high sensitivity setting, or in response to user selection of a self-saturation profile "display" button 616 as shown in FIG. 6B.

The user interface as shown in FIG. 7 may additionally or alternatively include a first indicator 705A, such as a green light, that indicates to the user that a surface is located within a valid subset of the total measurement range of the CRS. Additionally or alternatively, a second indicator 705B, such as a red light, may be provided to indicate that a surface is located in an invalid peak portion of the nominal total measurement range, preventing a valid measurement. More generally, any visual, audio, or other indication that allows the user to differentiate between a first state, in which the workpiece surface is located within a valid subset, and a second state, in which the workpiece surface is located within an invalid peak portion, may be used. It will be appreciated that the graphical representation of a valid subset of measurement positions shown in FIG. 7 is not limiting. Alternative representations are within the scope of the present disclosure. For example, a valid subset may be represented numerically, for a given sampling rate.

Figure 8:
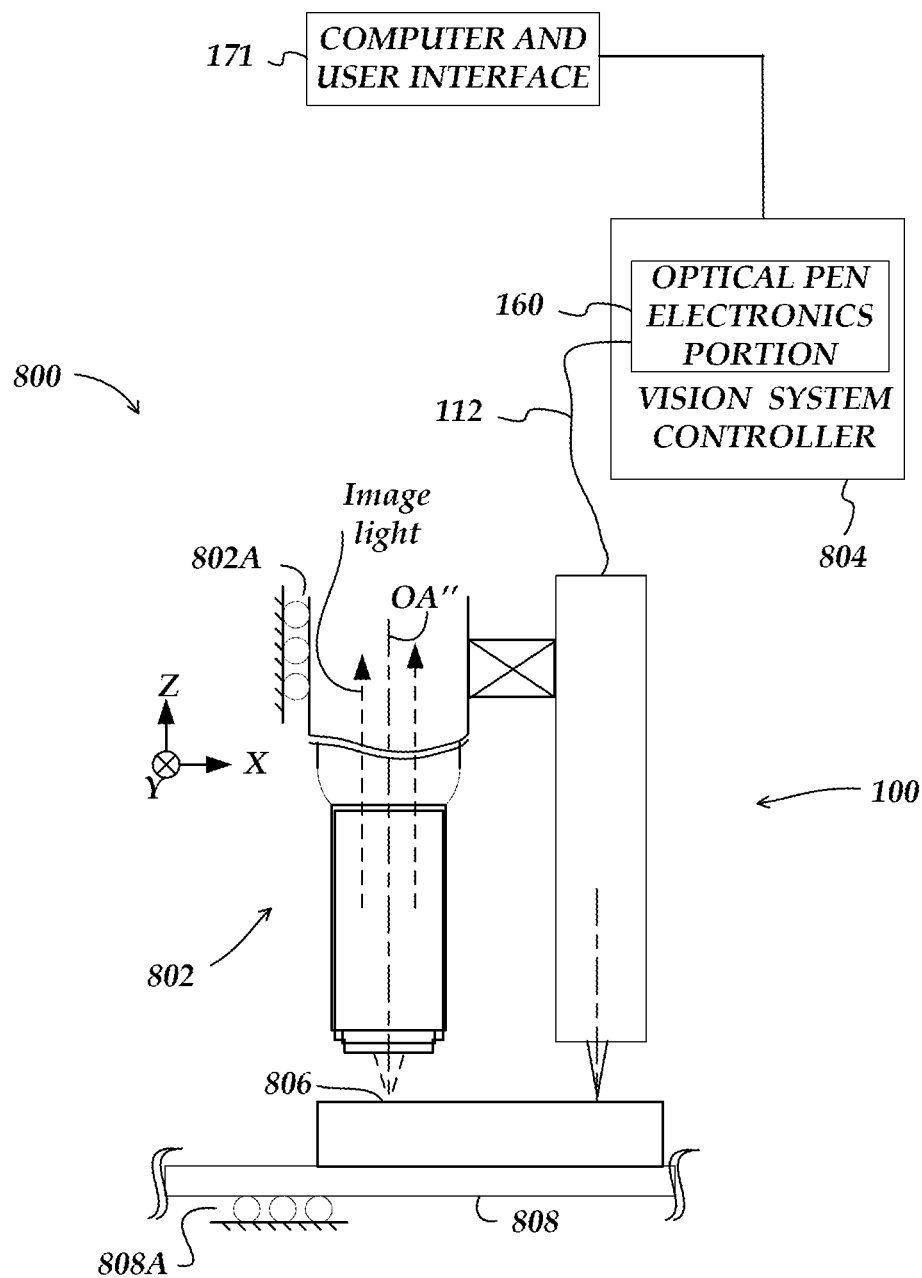
FIG. 8 is a diagram illustrating an exemplary embodiment of a machine vision inspection system comprising a CRS system used to measure a low reflectivity workpiece surface.

In some exemplary embodiments, locating a workpiece surface within a subset of a nominal total measurement range along the optical axis OA of the CRS may be performed automatically in a machine vision inspection system. FIG. 8 is a diagram illustrating an exemplary embodiment of a machine vision inspection system 800 comprising a CRS system, including an optical pen 100 used to measure a low reflectivity workpiece surface. When the machine vision inspection system (the CRS system) 800 is used to perform a height measurement for a low reflectivity workpiece surface, a user may select a lower sampling rate (a longer exposure time) and the machine vision inspection system 800 may automatically locate a workpiece surface to be measured within a valid subset of a nominal total measurement range along the optical axis OA of the CRS system.

The machine vision inspection system 800 is a microscopic-type machine vision and inspection system with an optical imaging system 802 such as that described in commonly assigned U.S. Pat. Nos. 8,085,295 and 7,454,053, which are hereby incorporated by reference. Various aspects of vision measuring machines and control systems are also described in more detail in commonly assigned U.S. Pat. No. 7,324,682 and U.S. Patent Application Publication No. 2005/0031191, which are also hereby incorporated by reference.

As described in more detail in the '682 patent and the '191 publication, and illustrated in FIG. 8, the machine vision inspection system (MVIS) 800 may include a vision system controller 804 which is usable to recall captured and stored workpiece inspection images, to inspect and analyze workpiece features in such workpiece inspection images, and to store and/or output the inspection results. A conventional camera portion of the MVIS may include an optical imaging system 802 including an objective lens having an optical axis OA" that magnifies and images the surface of a workpiece 806 to a camera (not shown), while achieving focus by moving along a Z axis guide bearing 802A. The workpiece 806 on a stage 808 is movable along X and Y axes on guide bearings 808A. The MVIS 800 may be approximately comparable to those available with the QUICK VISION™ QV Apex series of vision systems available from Mitutoyo America Corporation (MAC), located in Aurora, Ill. The MVIS 800 may be configured to mount a CRS (e.g., in the form of the CPS optical pen 100) to move along the Z-axis direction in tandem with the optical imaging system 802 (in this particular embodiment) to be used in conjunction with various measurement functions. The fiber optic cable 112 connects the CPS optical pen 100 to the optical pen electronics portion 160. The machine vision inspection system 800 includes a computer and user interface 171 and the vision system controller 804. The vision system controller 804 may act as a host system for communicating with the CPS optical pen electronics portion 160 (see also FIG. 1). The MVIS user interface 171 may act as a CRS user interface as well, and may provide some or all portions of the various CRS user interface features outlined above, especially during learn mode operations of the MVIS 800. In various embodiments, the MVIS user interface 171 and the CRS user interface may be merged and/or indistinguishable.

The (Z) measurement ranges of the optical imaging system 802 and the optical pen 100 may be calibrated or referenced to one another and to the MVIS Z axis controller coordinates. The optical pen electronics portion 160 and the vision system controller 804 may be configured to exchange data and control signals according to known methods. Thus, the MVIS 800 may be used to automatically locate a surface of the workpiece 806 to be measured within a valid subset of a nominal total measurement range of the CPS optical pen 100, for any current sample rate.

For example, the vision system controller 804 may refer to a self-saturation profile obtained and stored for a given (lower) sampling rate in the optical pen electronics portion 160 to determine the location of a valid subset within a nominal total measurement range of the CPS optical pen. The vision system controller 804 may then direct the Z-axis position of the MVIS to automatically position the CPS optical pen 100 in relation to the workpiece 806, while the vision system controller 804 also moves the workpiece 806 to various desired X-Y measurement positions (e.g., to profile a portion of the surface using the CRS).

Figure 9:
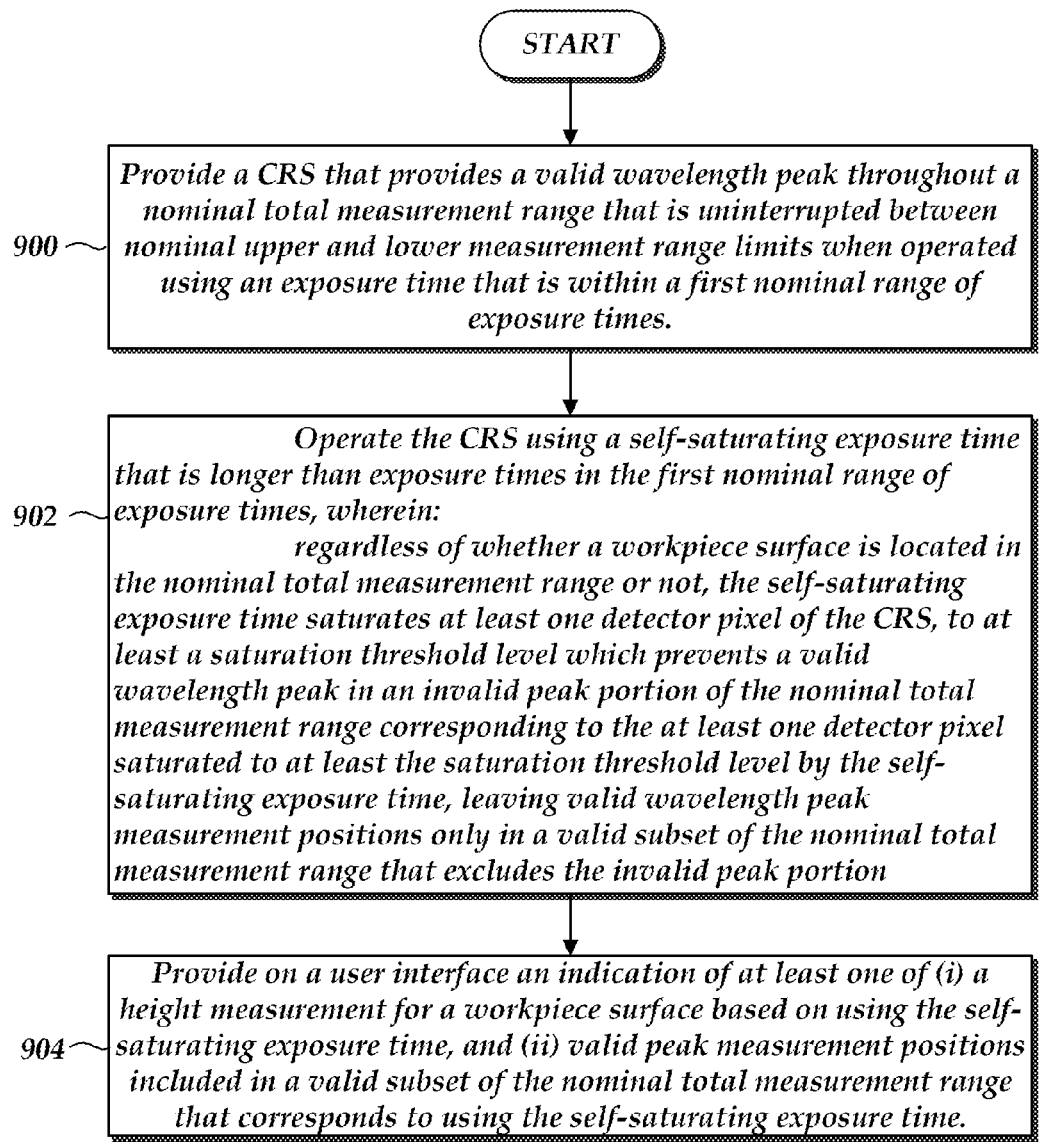
FIG. 9 is a flow diagram illustrating a routine for operating a CRS system to perform a height measurement of a low reflectivity workpiece surface.

FIG. 9 is a flow diagram illustrating a routine for operating a CRS system to perform a height measurement of a low reflectivity workpiece surface. At a block 900, a CRS system is supplied, which provides a valid wavelength peak throughout a nominal total measurement range along the optical axis OA of the CRS system when operated using an exposure time that is within a nominal range of exposure times. At a block 902, the CRS system is operated using a self-saturating exposure time that is longer than exposure times in the first nominal range of exposure times, wherein, regardless of whether a workpiece surface is located in the nominal total measurement range or not, the self-saturating exposure time saturates at least one detector pixel of the CRS, to at least a saturation threshold level which prevents a valid wavelength peak in an invalid peak portion of the nominal total measurement range corresponding to the at least one detector pixel saturated to at least the saturation threshold level by the self-saturating exposure time, leaving valid wavelength peak measurement positions only in a valid subset of the nominal total measurement range that excludes the invalid peak portion. At a block 904, an indication is provided on a user interface of the CRS system, the indication being at least one of (i) a height measurement for a workpiece surface based on using the self-saturating exposure time (e.g., as in the measurement distance field 701 in FIG. 7), and (ii) valid peak measurement positions included in the valid subset of the nominal total measurement range (e.g., the valid subset display portion 703 in FIG. 7).

CRS methods and systems according to the present invention allow for operation of a CRS system at longer exposure times (e.g., as provided by lower sampling rates, for example in the range of about 25 Hz to 100 Hz), which were previously not available for reliable operation (e.g., by relatively unskilled users), to thereby achieve a distance measurement on workpiece surfaces that have low reflectivity.

While the preferred embodiments of the invention have been illustrated and described, numerous variations in the illustrated and described arrangements of features and sequences of operations will be apparent to one skilled in the art based on this disclosure. For example, a CPS including an optical pen has been shown herein. However, a CRS system such as a chromatic line sensor, may be configured to operate according to the systems and methods disclosed herein. Thus, it will be appreciated that various changes can be made to embodiments disclosed herein without departing from the spirit and scope of the invention.

The various embodiments described above can be combined to provide further embodiments. Aspects of the embodiments can be modified to provide yet further embodiments. These and other changes can be made to the embodiments in light of the above-detailed description.

The embodiments of the invention in which an exclusive property or privilege is claimed are defined as follows:

1. A method for operating a chromatic range sensor (CRS) system to perform a workpiece height measurement of a low reflectivity workpiece surface, the method comprising:

providing a CRS that provides a valid wavelength peak throughout a nominal total measurement range that is uninterrupted between nominal upper and lower measurement range limits when operated using an exposure time that is within a first nominal range of exposure times;

operating the CRS using a self-saturating exposure time that is longer than exposure times in the first nominal range of exposure times, wherein:

regardless of whether a workpiece surface is located in the nominal total measurement range or not, the self-saturating exposure time saturates at least one detector pixel of the CRS, to at least a saturation threshold level which prevents a valid wavelength peak in an invalid peak portion of the nominal total measurement range corresponding to the at least one detector pixel saturated to at least the saturation threshold level by the self-saturating exposure time, leaving valid wavelength peak measurement positions only in a valid subset of the nominal total measurement range that excludes the invalid peak portion; and providing on a user interface portion of the CRS an indication of at least one of (a) a height measurement for a workpiece surface based on using the self-saturating exposure time, and (b) valid peak measurement positions included in the valid subset of the nominal total measurement range that corresponds to using the self-saturating exposure time.

2. The method of claim 1, wherein the step of providing an indication of (a) a height measurement for a workpiece surface based on using the self-saturating exposure time comprises locating the workpiece surface in the valid subset of the nominal total measurement range.

3. The method of claim 2, wherein the step of providing an indication of (a) a height measurement for a workpiece surface based on using the self-saturating exposure time comprises providing a plurality of respective height measurements for respective points on the workpiece surface.

4. The method of claim 1, wherein the indication (b) is provided on the user interface portion of the CRS and the indication (b) comprises at least one of (b-i) a graphical representation of the valid peak measurement positions included in the valid subset of the nominal total measurement range, and (b-ii) an indication that a workpiece surface is positioned in the invalid peak portion of the nominal total measurement range.

5. The method of claim 1, wherein the invalid peak portion comprises two discrete segments of the nominal total measurement range.

6. The method of claim 1, wherein the valid subset of the nominal total measurement range comprises two discrete segments of the nominal total measurement range.

7. The method of claim 1, wherein the indication (b) is provided on the user interface portion of the CRS and the indication (b) comprises at least one of, (b-i) a display indicative of the upper and lower limits of at least one uninterrupted sub-range of valid peak measurement positions that is included in the valid subset of the nominal total measurement range, and (b-ii) a first display state of a valid/invalid indicator comprising the first display state and a second display state that are displayed in response to measurements obtained in the valid subset of the nominal total measurement range and measurements obtained in the invalid peak portion, respectively.

8. The method of claim 1, wherein exposure times are associated with corresponding sample rates on the user interface portion of the CRS, and the step of operating the CRS using a self-saturating exposure time comprises operating the CRS using a sample rate corresponding to the self-saturating exposure time.

9. The method of claim 8, wherein respective exposure times in the first nominal range of exposure times are associated with corresponding sample rates in a first nominal set of sample rates indicated on the user interface portion of the CRS, and the step of operating the CRS using a self-saturating exposure time comprises operating the CRS using a slower sample rate than sample rates included in the first nominal set of sample rates.

10. The method of claim 9, wherein the first nominal set of sample rates are associated with a first normal operating mode indicated on the user interface portion of the CRS, and the slower sample rate is associated with a second high-sensitivity operating mode indicated on the user interface portion of the CRS.

11. The method of claim 8, wherein the sample rate corresponding to the self-saturating exposure time is at most 60 Hz.

12. The method of claim 11, wherein the sample rate corresponding to the self-saturating exposure time is at most 35 Hz.

13. The method of claim 1, wherein the step of operating the CRS using a self-saturating exposure time is performed in a high sensitivity measurement mode selected by a user in the user interface portion of the CRS.

14. The method of claim 1, further comprising obtaining a self-saturation profile of the CRS which correlates the valid subset of the nominal total measurement range with the self-saturating exposure time in response to a user selection of an operable element on the user interface of the CRS, prior to the step of operating the CRS using said self-saturating exposure time.

15. The method of claim 14, wherein the step of providing an indication of at least one of (a) a height measurement for a workpiece surface based on using the self-saturating exposure time, and (b) valid peak measurement positions included in the valid subset of the nominal total measurement range that corresponds to using the self-saturating exposure time, utilizes the obtained self-saturation profile that specifies the valid subset of the nominal total measurement range for the corresponding self-saturating exposure time.

16. The method of claim 14, further comprising:
obtaining multiple self-saturation profiles of the CRS, each of which correlates a valid subset of the nominal total measurement range with a corresponding different self-saturating exposure time, wherein different self-saturating exposure times are respectively associated with different sample rates; and
displaying the different sample rates as selectable operable elements on the user interface portion of the CRS.

17. The method of claim 14, further comprising:
automatically locating the workpiece surface in the valid subset of the nominal total measurement range in reference to the obtained self-saturation profile.

18. A chromatic range sensor (CRS) system for performing a workpiece height measurement of a low reflectivity workpiece surface, the CRS system comprising:
(a) an optics portion configured to focus different wavelengths at different distances along a measurement axis proximate to a workpiece surface to be measured, and to direct reflected radiation from the workpiece surface to a wavelength detector;
(b) an electronics portion including the wavelength detector configured to provide,
when the CRS system is operated using an exposure time that is within a first nominal range of exposure times, a valid wavelength peak throughout a nominal total measurement range that is uninterrupted between nominal upper and lower measurement range limits, and
when the CRS system is operated using a self-saturating exposure time that is longer than exposure times in the first nominal range of exposure times,
no valid wavelength peak in an invalid peak portion of the nominal total measurement range corresponding to one or more detector pixels that are saturated by the self-saturating exposure time to at least a saturation threshold level which prevents them from indicating a valid wavelength peak, regardless of whether the workpiece surface is located in the nominal total measurement range or not, leaving valid wavelength peak measurement positions only in a valid subset of the nominal total measurement range that excludes the invalid peak portion; and
(c) a user interface portion configured to provide an indication of at least one of (i) a height measurement for a workpiece surface located within the valid subset of the nominal total measurement range based on using the self-saturating exposure time, and (ii) valid peak measurement positions included in the valid subset of the nominal total measurement range that corresponds to using the self-saturating exposure time.

19. The CRS system of claim 18, wherein the CRS system is included in a machine vision inspection system including a moveable portion to which the optics portion is coupled to be moveable along X-, Y- and Z-directions relative to the workpiece surface, wherein the machine vision inspection system is configured to automatically locate the workpiece surface, relative to the optics portion, in the valid subset of the nominal total measurement range.

20. The CRS system of claim 18, wherein exposure times are associated with corresponding sample rates, and the user interface portion displays one or more sample rates respectively corresponding to one or more self-saturating exposure times.

* * * * *